United States Patent [19]

Mestetsky

[11] 4,142,014

[45] Feb. 27, 1979

[54] LAMINATE CARRYING A DISCRETE LAYER OF METAL SALTS OF LONG CHAIN ALKYL VINYL ETHER-MALEIC ANHYDRIDE COPOLYMERS

[75] Inventor: Thomas S. Mestetsky, Easton, Pa.

[73] Assignee: GAF Corporation, New York, N.Y.

[21] Appl. No.: 348,709

[22] Filed: Apr. 6, 1973

Related U.S. Application Data

[62] Division of Ser. No. 190,388, Oct. 18, 1971, abandoned.

[51] Int. Cl.$^2$ .................. E04F 13/20; E04F 15/16; C09J 7/02; C09J 7/04

[52] U.S. Cl. .................................. 428/40; 428/352; 428/463; 428/500; 428/524; 428/526; 428/528; 260/29.6 H; 427/208; 526/10; 526/47; 526/47.8; 526/47.9; 526/48.2; 526/48.3; 526/48 A

[58] Field of Search ............... 260/78.5 T; 161/257, 161/256, 215, 406, 259, 261, 263; 428/352, 500, 530, 463, 524, 526, 528, 40

[56] References Cited

U.S. PATENT DOCUMENTS

| | | | |
|---|---|---|---|
| 2,047,398 | 7/1936 | Voss et al. | 260/80.75 X |
| 2,876,894 | 3/1959 | Dahlquist et al. | 428/40 |
| 2,894,921 | 7/1959 | Jones | 260/17.4 |
| 3,436,378 | 4/1969 | Azorlosa et al. | 260/78.5 |
| 3,637,459 | 1/1972 | Parish et al. | 161/165 X |
| 3,765,934 | 10/1973 | Gaylord | 161/250 X |

OTHER PUBLICATIONS

Varoqui et al., J. Phys. Chem., 72, 250–211 (1968).

*Primary Examiner*—P. C. Ives
*Attorney, Agent, or Firm*—Walter C. Kehm; Marilyn J. Maue

[57] ABSTRACT

Metal salts of hydrolyzed long chain alkyl vinyl ether-maleic anhydride copolymers and thermally resistant release coating compositions comprising solutions or emulsions of said salts.

2 Claims, No Drawings

LAMINATE CARRYING A DISCRETE LAYER OF METAL SALTS OF LONG CHAIN ALKYL VINYL ETHER-MALEIC ANHYDRIDE COPOLYMERS

This is a division of application Ser. No. 190,388, filed Oct. 18, 1971 now abandoned.

The present invention relates to metal salts of hydrolyzed long chain alkyl vinyl ether-maleic anhydride copolymers characterized by their improved thermal resistance properties as compared to the corresponding unmodified alkyl vinyl ether-maleic anhydride copolymers. Additionally, the invention relates to thermally resistant release coating compositions comprising solutions or emulsions of the metal salts of the long chain alkyl vinyl ether-maleic anhydride copolymers.

Copolymers of alkyl vinyl ethers with maleic anhydride are well known in the art, having first been described in U.S. Pat. No. 2,047,398.

Such copolymers have been employed widely as release coatings because they are capable of providing excellent release properties. However, they have the disadvantage that they undergo bonding to adhesive substances with which they have been placed in contact, on being exposed to high temperatures. Such bonding completely negates their effectiveness for release coating purposes.

It is an object of the present invention to provide a method for improving the thermal resistance of alkyl vinyl ether-meleic anhydride copolymers.

It is another object of this invention to provide novel release coating resins characterized by their improved stability, improved thermal resistance properties and by their excellent release properties.

Still another object of this invention is to provide release coating compositions comprising solutions and emulsions containing such novel resins.

These and other objects and advantages of the invention will be apparent from the following disclosure.

It has been discovered in accordance with the invention that the metal salts of hydrolyzed long chain alkyl methyl ether-maleic anhydride copolymers are possessed of improved stability, improved thermal resistance and excellent release properties as compared to the corresponding free copolymer.

The metal salts of the present invention are readily prepared by intimately admixing metal oxide or hydroxide with a copolymer of an alkyl vinyl ether with maleic anhydride. The metal salt obtained (melting at about 300° C.) has significantly higher melting point than the alkyl vinyl ether-maleic anhydride copolymer.

The copolymer can be selected from the C8-C22 and preferably C10-C18 alkyl vinyl ether-maleic anhydride copolymers, and is capable of hydrolysis in the presence of aqueous alkali to salts of hydrolyzed alkyl vinyl ether-maleic acid copolymer.

The metal oxide and hydroxides used to form salts include metal oxides and hydroxides of metals such as sodium, potassium and lithium, copper, zinc, chromium, iron, lead, and antimony.

The mixing of the metal oxide or hydroxide and the copolymer may be effected by adding the metal oxide or hydroxide to a solution of the copolymer in any inert volatile solvent or mixture thereof in which the copolymer and the salt both will be soluble. In order to facilitate drying of films or coatings produced from the compositions in accordance with the invention, solvents having boiling points below about 110° C. are preferred. Examples of preferred solvents include the aromatic solvents such as for instance benzene, toluene or other volatile alkylated benzene, such as xylene and the highly aromatic solvents of petroleum origin such as mineral spirits or textile spirits. There can also be used as solvent alkanes such as hexane and heptane or chlorinated solvents such as 1,1,1-trichloroethane or perclene.

In accordance with one aspect of the invention, the metal oxide or hydroxide in the form of an aqueous solution thereof is added to the solution of the alkyl vinyl ether-maleic anhydride copolymer in the organic solvent.

In accordance with a further aspect of the invention, where it is desired to produce a water system release coating, the metal oxide or hydroxide is first dissolved in water and the solution of hydrolyzed alkyl vinyl ether-maleic anhydride copolymer in organic solvent then added.

The formation of the solution and the mixing of the components may be effected at room temperature, although slightly elevated temperatures may also be used.

The metal oxide or hydroxide is used in the amount with respect to said copolymer whereby the salt formed contains from 5 mol % to 350 mol % of metal calculated on copolymer.

The use of potassium hydroxide to form the salt brings about a self-emulsifying of the alkyl vinyl ether-maleic anhydride copolymer. In the case of the other metal oxide or hydroxides, auxiliary emulsifiers are required, as for instance Igepal CO-710 a trademark for a phosphate ester emulsifier manufactured by GAF Corporation, GAFAC RL-210 the trademark for a series of nonionic surfactants as defined, for example, in The Condensed Chemical Dictionary by Rose and Rose, Sixth Edition, page 600. The total amount of metal salt of the long chain alkyl vinyl ether-maleic anhydride copolymer in the release coating composition on a weight basis can vary in the range of 0.5% to 20%. The only requirement is that the solution be of sufficient concentration to form a substantially continuous coating on the surface to which it is applied after the solvent has been evaporated.

The release coating compositions of the present invention may be adhered to a surface by conventional air knife, trailing blade, roll, spraying, printing or casting methods. The coated substrate is then preferably subjected to heating for short periods of time.

The release coating composition of the present invention can be applied to a wide variety of surfaces to take advantage of their release properties. They can be used as mold release agents on bakery pans and candy trays. Likewise they can be used on paper, plastics and metal foils to provide release coatings when these materials are made into containers for such products as asphalt, wax, resin and the like. They can also be used to coat multiwall bags and cartons which contain rubber to coat cartons which will contain candy, baked goods and other sticky products. They are also useful to coat backing sheets for pressure sensitive tapes, labels, tags, decals, self-hanging wallpaper, decorative plastics and asphalt impregnated type wrapping. They can also be used on paper or metal as release agents for vinyl or urethane materials or in connection with thermal casting. Thus in general they can be used to coat any type of material such as cellulosics for instance glassine parchment, clay coated craft and the like and plastics such as nylon, polyacrylonitrile, polyesters, styrene, vinyl plastics, polyurethanes and the like. Moreover, they are also applicable to inorganic materials such as ceramics or metals as for instance, aluminum, magnesium, copper, steel or zinc.

The following examples are presented in order to further illustrate the present invention, but are in no way to be construed as limiting the scope thereof.

EXAMPLE 1

(Unmodified octoadecyl vinyl ether-maleic anhydride copolymer-prior art.)

There was added to a 40% by weight solution of octadecyl vinyl ether-maleic anhydride in toluene, sufficient additional toluene to dilute the polymer to 5% by weight (about 0.013% mol). The resulting solution was then placed in a reciprocating shaker and mixing allowed to take place for 20 hours. The solution was removed from the shaker and used to coat on 25 lb./3000 sq. ft. glassine using a Bird applicator having an 0.0005 inch clearance. The coating was then dried for 3 minutes at 120° C.

The release properties were determined after thermally accelerated aging by placing a strip of one inch wide Johnson and Johnson "Red Cross" adhesive tape against the coated surface, loading at 0.25 psi., aging at 70° C. for 20 hours. After cooling, the tape-coated paper assembly was delaminated in a Suter tensile tester at an angle of 180°. The force required for the delamination amounted to 450 g./inch width.

EXAMPLE 2

(Ethylene Glycol as additive — prior art.)

In U.S. Pat. No. 2,876,894, release coating materials consisting of solid copolymers of a vinyl monomer of the class consisting of higher alkyl vinyl esters and ethers and a maleic monomer of a class consisting of maleic acid and the half esters and half amides thereof are disclosed. The copolymer of Example 1 of the patent i.e., an ethylene glycol half ester of allyl stearate-maleic anhydride is described as a release coating polymer which retains its effectiveness at an elevated temperature for prolonged periods. In order to compare the effectiveness of the metal salt copolymers of the invention with an ethylene glycol modified copolymer in accordance with the above-mentioned patent, the copolymer of Example 1 was modified by treatment with ethylene glycol and evaluated as follows: The procedure of Example 1 was followed excepting that immediately following dilution of the copolymer with toluene, 0.6 g of ethylene glycol (76.6 mol % on the octadecyl vinyl ether-maleic anhydride) was added to the solution. The force required to delaminate the coating produced with the resultant solution amounted to 520 g./in. tape width. Further runs with coatings produced with 0.4 g ethylene glycol per 100 g and 0.2 g ethylene glycol/100 g (51 and 25.5 mol percent, respectively) required delamination forces of 490 and 480 g./inch tape width, respectively. It is to be noted that in each case, the force required was higher than that in the case of the unmodified copolymer of Example 1.

EXAMPLE 3

(Invention)

The procedure of Example 2 was repeated, using in place of the ethylene glycol a series of different metal oxides and hydroxides. The metal oxides and hydroxides were used in the form of 28% solutions thereof in water and were added to 5% toluene solution of hydrolyzed octadecyl vinyl ether-maleic anhydride. The results obtained are set out in the following table:

| Additive | g. 28%/100 g. 5% CDVE/MA | Mole % Metal on CDVE/MA | Delamination Force g./inch tape width |
|---|---|---|---|
| ZnO | 0.4 | 11.1 | 460 |
|  | 0.6 | 16.3 | 353 |
|  | 1.2 | 33.3 | 400 |
| $CU_2O$ | 0.4 | 6.5 | 410 |
|  | 0.6 | 9.0 | 3.10 |
|  | 1.2 | 19.0 | 300 |
| CuO | 0.4 | 11.1 | 370 |
|  | 0.6 | 17.5 | 380 |
|  | 1.2 | 33.3 | 370 |
| NaOH | 0.4 | 15.9 | 350 |
|  | 0.6 | 33.3 | 310 |
|  | 1.2 | 66.7 | 220 |

EXAMPLE 4

The procedure as set out in Example 3 was repeated except that instead of the 28% metal oxide or hydroxide solution, 50% solutions were used and in that the coating solution was heated at 78° C. on a mechanical roller instead of using the shaker at room temperature. The results obtained are set out in the following table:

| Additive | g. 50%/100 g. 5% ODVE/MA | Mole % Metal on CDVE/MA | Delamination Force g./inch tape width |
|---|---|---|---|
| NaOH | 0.5 | 50.0 | 230 |
|  | 1.0 | 100.0 | 192 |
| $Cu_2O$ | 9.0 | 50.0 | 212 |
|  | 18.0 | 100.0 | 207 |

EXAMPLE 5

It is often a great advantage to produce water system release coatings. Such systems using potassium hydroxide as a modifying agent were prepared as follows: Potassium hydroxide in amount as indicated in the following table was added to 100 g of distilled water. 12.5 g of 40% octadecyl vinyl ether-maleic anhydride in toluene were then introduced into the potassium hydroxide solution. The resultant mixtures were then placed in 8 oz. bottles, the bottles sealed and placed in a roller oven at 78° C. for from 1 to 2 hours. The coatings were then prepared from the resulting compositions and the coatings evaluated as set out in Example 1. The following table shows the results of these runs:

| g. KOH | Mole % KOH on ODVE/MA | Time in Oven (hr.) | Delamination Force g./inch tape width |
|---|---|---|---|
| 1.25 | 175 | 1 | 270 |
| 1.25 | 175 | 2 | 260 |
| 0.84 | 118 | 1 | 260 |
| 0.84 | 118 | 2 | 230 |

EXAMPLE 6

Example 5 was repeated but in place of the 12.5 g of the 40% octadecyl vinyl ether-maleic anhydride solution, 5 g of the toluene solution of the copolymer were added to the 100 g of water in the 8 oz. bottles. Also, the bottles were kept in the roller oven at 78° C. for 81 hours.

The results which show the long term stability of the coating solution are set out in the following table:

| g. KOH | Mole % KOH on CDVE/MA | Delamination Force g./inch Width |
|---|---|---|
| 0.3 | 105 | 280 |
| 0.4 | 140 | 290 |
| 0.5 | 175 | 280 |
| 1.0 | 350 | 270 |

EXAMPLE 7

The effect of high temperature casting on KOH modified copolymers of the invention was determined by preparing an emulsion consisting of 175 mol% KOH on octadecyl vinyl ether-maleic anhydride, heated for 1 hour at 78° C. and applying the resultant emulsion by means of a paint brush to a 6" × 6" sheet plate. A thermoplastic urethane polymer (6505-125 AEB) was then pressed against the surface at 1500 p.s.i. by means of plates heated to 200° C. in a laboratory Carver press. The release was quantitatively equal to that obtained using a Teflon coated plate.

EXAMPLE 8

The procedure as set out in Example 4 was followed excepting that as solvent heptane was used, the metal salts were used at 10% and in that the polymer used consisted of a mixture of 63–66% C18 vinyl ether, 25–30% C16 vinyl ether, 4–6% C14 vinyl ether, 2–3% C12 vinyl ether and 0.03% C10 vinyl ether copolymerized with an equimolar amount of maleic anhydride.

The results obtained in evaluating the salts of the copolymers are set out in the table which follows:

| Additive | g 10% salt/ 100 g 5% polymer | Delamination Force 8/inch tape Width |
|---|---|---|
| None | 0 | 660 |
| $Cr_2O_3$ | 10 | 270 |
| $Cr_2O_3$ | 25 | 280 |
| $Fe_2O_3$ | 10 | 270 |
| $Fe_2O_3$ | 25 | 290 |
| PbO | 10 | 290 |
| PbO | 25 | 300 |
| $Sb_2O_3$ | 10 | 260 |

EXAMPLE 9

There were introduced into a two-gallon container 7900 g tap water and 100 g KOH. The resulting mixture was agitated until a clear solution had formed. 1000 g of a 40% toluene solution of octadecyl vinyl ether-maleic anhydride was added and the mixture agitated. The mixture was then heated to 76°–80° C., held at that temperature with agitation for one and a half hours and then cooled. There was thusly obtained a milky-appearing fluid having a Brookfield viscosity of 54 cps.

This material was then used to coat a 30-lb. parchment using a pilot air knife coater - 90 fpm, 2.0 inches Hg air knife pressure. The coating weight was found to be 0.12 lb/3000 ft$^2$. The sheet thereby formed had a delamination force of 355 g/inch.

A solvent based urethane coating was prepared as follows: A mixture was formed of the following:

| Estane 5707 Fl (urethane polymer) | 100 parts |
|---|---|
| DMF | 150 parts |
| Acetone | 150 parts |
| CIBA-GEIGY Microleth Green GK Pigment | 80 parts | and was cast (18 mil thick - wet) onto the sheet prepared as described above, using a Bird Applicator. The casting was air dried for 10 minutes, further dried at 38.5° C. for 10 minutes and finally cured at 121° C. for 5 minutes. The sample had release properties which could be classified as excellent.

EXAMPLE 10

The copolymer of decyl vinyl ether-maleic anhydride and lauryl vinyl ether-maleic anhydride were copolymerized in 1,1,1-trichloroethane and the resulting product formed treated with aqueous KOH. The product when tested showed the same results as those reported in connection with the copolymer of Example 5.

EXAMPLE 11

Although the potassium slat of hydrolyzed alkyl vinyl ether-maleic anhydride copolymer is self-emulsifiable in water, some of the other metal salts produced in accordance with the invention are not. A series of experiments were carried out using such other metal salts in combination with conventional surfactants.

(A) A mixture of 20 parts octadecyl vinyl ether-maleic anhydride and 4 parts nonylphenoxy poly (ethyleneoxy) ethanol containing 10–11 moles ethylene oxide was mixed with sufficient water to dilute to a 5% polymer content. A uniform emulsion was formed which was then applied as a coating and tested for release properties. The coating showed a delamination force of 653 g/inch.

(B) The procedure of Example (A) was repeated excepting that 0.16 parts of LiOH were added. The delamination force was determined and amounted to 413 g/inch.

(C) The procedures of (A) and (B) were repeated excepting that 3 parts of the ethylene oxide derivative were added. The delamination force without the LiOH amounted to 713 g/inch while in the presence of the LiOH it amounted to 413 g/inch.

(D) In an anologous manner to the above, it was established that the emulsions of non-self-emulsifying metal salts of octadecyl vinyl ether-maleic anhydride could be prepared using the following surfactants:

1. Nonylphenol based surfactant similar to the above except that it contains 4 mols EO.
2. Nonylphenol based surfactant similar to the above except that it contains 40 moles EO.
3. Octylphenoxy poly (ethyleneoxy) ethanol containing 9 moles EO.
4. Diisooctylpoly (ethyleneoxy) ethanol containing 50 moles EO.
5. Sodium N-methyl-N-tallow acid taurate.
6. Sodium salt of complex phosphate ester - GAFAC LO529.

The salts in accordance with the invention and specifically the metal salts of long chain alkyl vinyl ether-maleic anhydride copolymers may be used per se as release coating agents or alternatively they may be used in the form of their solution in various solvents as set out herein and in combination with the conventional thickening agents, surfactants, pigments, corrosion-inhibitants, bacteriocides, bacteriostats, film-formers such as starch, polyvinyl alcohol as well as with other additives known to the art.

I claim:

1. A laminated product comprising a non-absorptive substrate, at least one surface of which carries a discrete, continuous layer deposited from a surface release composition comprising an organic solvent solution containing a metal salt of a hydrolyzed alkyl vinyl ethermaleic anhydride copolymer wherein alkyl contains 8–22 carbon atoms and the metal salt contains from 5 mole % to 350 mole % of the metal based on the copolymer; said layer being in contact with a second substantially non-absorptive surface from which it is readily releasable.

2. The laminated product of claim 1 wherein the surface release composition additionally contains an emulsifying agent.

* * * * *